Jan. 24, 1956    R. H. WITT    2,731,780
PLANT LIFTER FOR HARVESTING MACHINE
Filed March 12, 1953    3 Sheets-Sheet 1
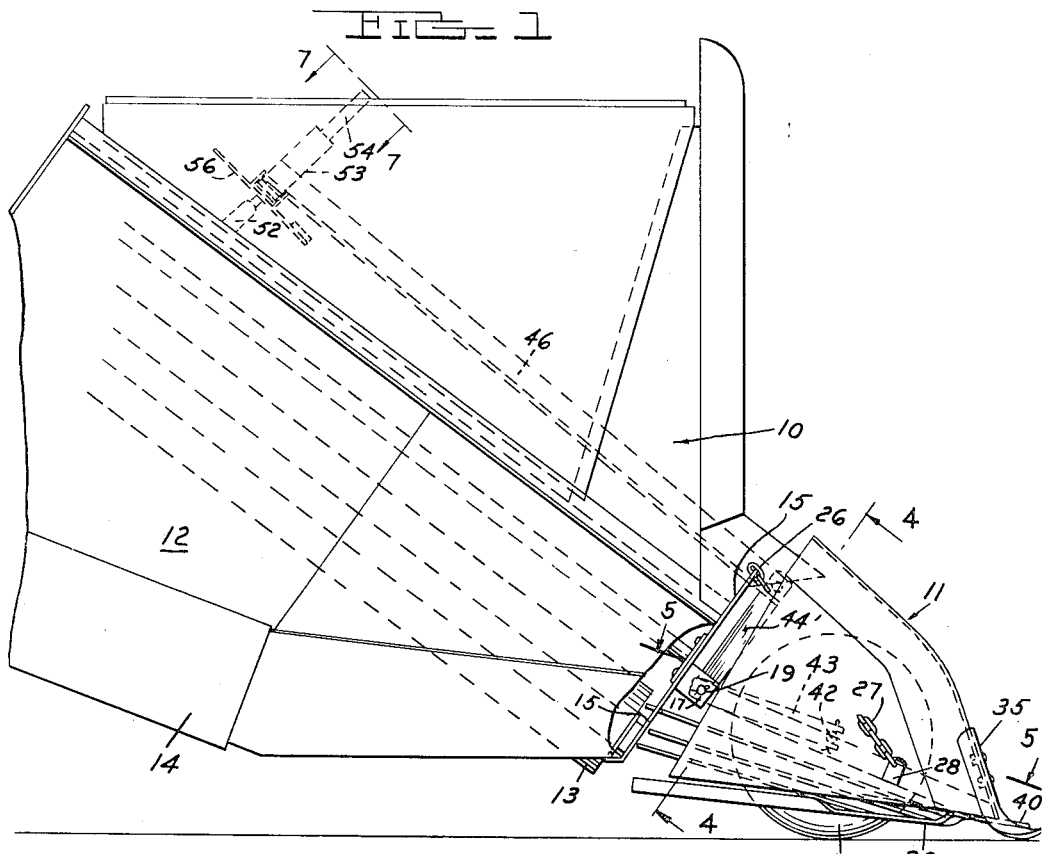
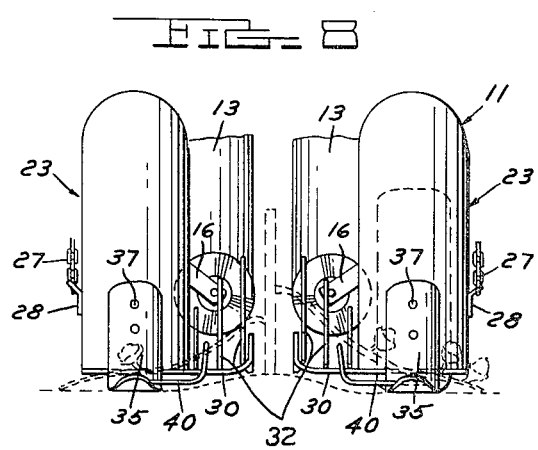
INVENTOR.
ROBERT H. WITT
BY
ATTORNEYS

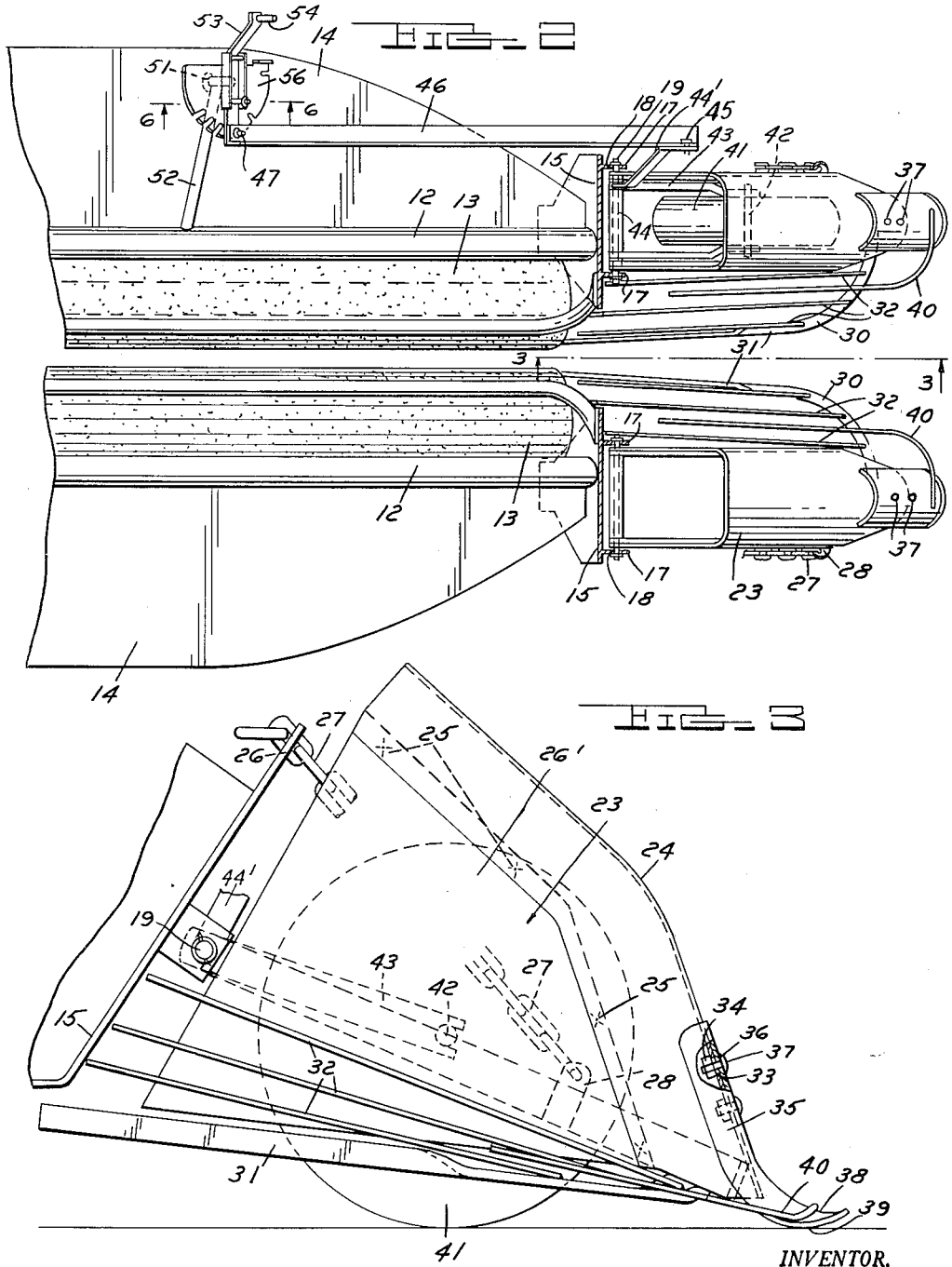

Jan. 24, 1956   R. H. WITT   2,731,780
PLANT LIFTER FOR HARVESTING MACHINE
Filed March 12, 1953   3 Sheets-Sheet 3
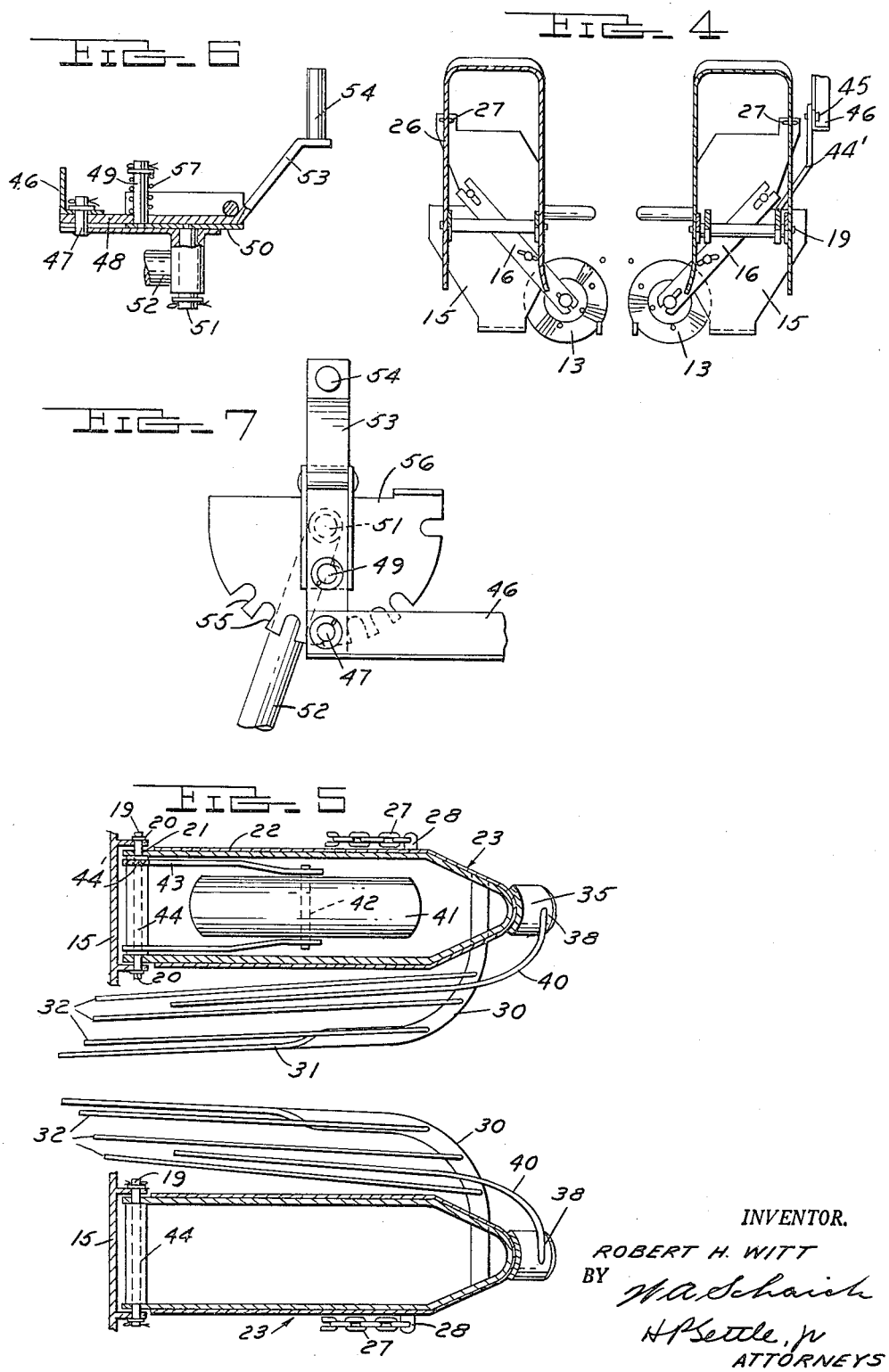

United States Patent Office 2,731,780
Patented Jan. 24, 1956

2,731,780

PLANT LIFTER FOR HARVESTING MACHINE

Robert H. Witt, Royal Oak, Mich., assignor, by mesne assignments, to Ford Motor Company, Dearborn, Mich., a corporation of Delaware Application March 12, 1953, Serial No. 341,926

4 Claims. (Cl. 56—119)

The present invention relates to a plant lifter for a harvesting machine and more particularly to a device for elevating and positioning plants prior to subjection of the same to harvesting action.

In the harvesting of cotton and similar crops, it has been proposed that the crop be removed from a growing plant by interposing the plant between a pair of contra-rotating stripping elements, such as bristle brushes or the like. The plant must be accurately positioned to insure adequate stripping action. The present invention now provides an improved plant lifting and positioning apparatus whereby accurate entry of the plant into the stripping area is insured.

More particularly, the plant lifter of the present invention is particularly adapted for use with a harvesting machine in which a pair of relatively rotatable stripping elements are enclosed within flare sheets or the like. The lifter preferably takes the form of a pair of spaced housings pivotally secured to the flare sheets and adapted to straddle the plant row. One of the housings preferably encloses a gauge wheel which is suspended independently of the housing and which is positioned by a remote control linkage. The housings carry inwardly projecting and rearwardly extending primary tines which are inclined rearwardly and upwardly toward the plant stripping elements. The front end of the housings are provided with vertically adjustable, ground-contacting shoes which carry secondary tines which overlie the primary tines and which aid in elevating low lying portions of the crop.

It is therefore, an important object of the present invention to provide improved plant lifters for a harvesting machine. Another object is the provision of a plant lifting device including relatively adjustable elements carrying individual tines which are adjustable upon adjusting the elements.

It is a further important object to provide plant lifters for a harvesting machine including housings adapted to straddle the crop row, and inwardly and rearwardly extending, vertically adjustable tines carried by the housings.

It is a still further important object to provide a plant lifter for a harvesting machine including a main lifter housing enclosing an adjustable gauge wheel and having a forward ground-engaging shoe, both the housing and the shoe carrying plant-positioning tines which are vertically adjustable.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of the harvesting head of a cotton stripping machine provided with plant lifters of the present invention;

Figure 2 is a plan view of the harvesting head of Figure 1;

Figure 3 is an enlarged side view taken along the plane 3—3 of Figure 2 and further illustrating a plant lifter;

Figure 4 is a sectional view taken along the plane 4—4 of Figure 1;

Figure 5 is a sectional view taken along the plane 5—5 of Figure 1;

Figure 6 is an enlarged sectional view taken along the plane 6—6 of Figure 2;

Figure 7 is a enlarged sectional view taken along the plane 7—7 of Figure 1; and Figure 8 is a front elevational view illustrating the lifters as employed to position plants for harvesting action.

As shown on the drawings:

In Figure 1, reference numeral 10 refers generally to a harvesting head provided with plant lifters 11 of the present invention.

More particularly, the harvesting head, as best illustrated in Figures 1 and 2, comprises laterally spaced side flare sheets 12 partially enclosing a pair of laterally spaced, contrarotating stripping brushes 13 and provided with rearwardly extending suction ducts 14 for conveying the cotton rearwardly to a receptacle. The flare sheets 12 terminate in upstanding front plates 15 which carry adjusting arms 16 supporting the forward ends of the brushes 13. The plates 15 are each provided with a pair of forwardly projecting laterally spaced ears 17 having laterally aligned and registering apertures 18 through which extends a pivot pin 19.

The pin 19 is secured in place by suitable means, as by cotter keys 20, and the pin projects through laterally aligned apertures 21 formed in a generally U-shaped forwardly extending strap 22. The strap 22 snugly abuts the inner surface of, and is secured to, a housing 23.

The housings 23 are each defined by an upper, downwardly and forwardly extending arched cap section 24 having depending lateral side extensions secured as by welding at 25, to side sheets 26' which are individually attached to the spaced legs of the strap 22. Each of the plates 15 is provided with a notch 26 adjacent its upper end which receives therethrough one link of a downwardly and forwardly extending chain 27, the forward end of the chain being retained by an apertured ear 28 welded or otherwise rigidly secured to the outer side sheet 26'.

It will be appreciated that the lifter housings 23 are pivotal about the pins 19 and that the chain 27 serves to limit downward movement of the housing while accommodating upward movement thereof about the pivot pins.

Each housing 23 is provided adjacent its lower forward end with a primary lifter tine 30 taking the form of a rectangular strap welded beneath the forward end of the lifter cap 24 and projecting inwardly and rearwardly therefrom. The strap is twisted intermediate its length as at 31 to extend vertically for the remainder of its length. The primary tine 30 terminates in closely spaced relation to, and in substantial alignment with, the lower forward extremity of the adjacent brush 13. The tine 30 is provided with additional tine rods 32 spaced laterally therealong to extend rearwardly and upwardly toward the adjacent brush.

The forward lower end of each cap section 24 is provided with an aperture 33 registering with the center hole of a nut 34 welded thereto. A pair of plant lifter shoes 35 are each provided with an upper portion having slots 36 registering with the apertures 33 and adapted to receive thereto a bolt 37 threadedly retained by the adjacent nut 34. The slots 36 in the shoes 35 accommodate vertical adjustment of the shoes associated with the lifter housings.

Each of the shoes 35 terminates in a forward upturned lip portion 38, the under surface 39 of which is adapted to contact the ground. The upturned portion 38 carries a lower secondary or pre-lifting tine 40 which projects rearwardly and inwardly to overlie the tines 30 and 32 and which terminates in closely spaced relation to the front end of the adjacent brush 13.

It will be appreciated that the chain 27 is adjusted for length so that the under surface 39 of the shoe 35 engages the ground under normal conditions. The tine 40 cooperates with the remainder of the tines 31 and 32 to elevate low lying portions of the plant positioned therebetween. The shoe tine 40 is appreciably lower than the remainder of the tines and is effective to elevate portions of the plant which are practically lying upon the ground. Also, the shoe is particularly effective too, in the elevation of low lying portions of a ridged crop, since the shoe may be adjusted to a position well below that of the plant lifter housing proper, as shown in Figure 8.

The inboard housing 23 encloses a gauge wheel 41, preferably of the semi-pneumatic type, this wheel being carried by an axle 42 journaled by a pair of axle arms 43 rigidly secured to a tube 44 surrounding the plant lifter pivot pin 19. The inner arm 43 carries an upstanding arm 44' rigidly secured thereto and pivotally connected, as at 45, to a forwardly and downwardly projecting actuating arm 46. The actuating arm 46 is connected at its rear end, as through pin 47 to a pivot plate 48, movable about an upstanding pin 49 which is carried by a positioning plate 50 rigid upon a vertical axle 51 journaled upon a laterally extended support arm 52.

The plate 48 has an upstanding continuation 53 which terminates in a handle 54 through which the plate may be turned about pin 49 to actuate the arm 46 forwardly and rearwardly, thereby vertically positioning the wheel 41 within the surrounding lifter housing 23. It will be noted that the pin 47 cooperates with positioning notches 55 in a fixed positioning plate 56 rigid with the supporting arm 52, and the pin 49 is surrounded by a positioning spring 57 urging the pin 47 downwardly onto one of the notches 55. Upon depressing the handle 54, the pin 47 is raised from a given notch 55 and the arm may then be turned to position the pin above a chosen notch so that release of the handle will position the pin 47 therein to retain the wheel in its chosen adjusted position.

It will thus be understood that the present invention provides a novel plant lifting assembly comprising a pair of housings adapted to straddle a plant row and bearing tines effective to lift low lying portions of the plants for ready access to stripping brushes. One of the housings encloses a gauge wheel which may be positioned vertically entirely independently of the housing. The housings are provided with front mounted pre-lifter shoes which carry secondary tines for elevating particularly low lying portions of the plants. Means are also provided for positioning the shoes in contact with the ground and for limiting lowering movement of the lifters while accommodating elevating movement thereof.

I claim:

1. In a harvester having a pair of relatively rotatable crop-stripping elements disposed between a pair of flare sheets, a plant lifter assembly comprising a housing disposed at the forward end of each flare sheet and having a smooth exterior surface forming a continuation of said flare sheet, a vertically adjustable shoe secured to said housing at the forward end thereof, laterally and rearwardly directed primary tines carried by said housing for elevating lower plant portions for exposure to said stripping elements, and a secondary tine carried by said shoe in advance of said primary tines, the forward end of said secondary tine being disposed beneath said primary tines to elevate lower plant portions adjacent the ground and the trailing end of said secondary tine being disposed above the adjacent primary tines to transfer plant portions lifted thereby to said primary tines.

2. In a harvester having a pair of relatively rotatable crop-stripping elements disposed in laterally spaced relation between a pair of flare sheets, a plant lifter assembly comprising a pair of housings disposed at the forward end of said flare sheets in advance of said stripping elements respectively, and laterally outwardly therefrom, a plurality of trailing primary plant lifting tines carried by said boots to project laterally inwardly directly in advance of said stripping elements and extending rearwardly into juxtaposition to the element forward ends, shoes carried at the free forward ends of said housings to project forwardly and downwardly therebeyond, and secondary tines fixed to said shoes adjacent the forward extremities thereof to elevate lower plant portions in advance of said primary tines, said secondary tines having their rear ends overlying said primary tines and terminating well in advance of said stripping elements to transfer said lower plant portions to said primary tines and thence to said stripping elements.

3. In a crop stripper having flare sheets enclosing laterally spaced stripping elements, a vertically movable plant lifter housing at the forward ends of each of said flare sheets, respectively, rearwardly and upwardly extending tines carried by said lifters and aligned with said stripping elements, additional tines located at the extreme forward ends of said housings to project rearwardly therefrom to overlie said first-mentioned tines, and means for adjusting said additional tines vertically with respect to said housings and said first-mentioned tines.

4. For use with a harvesting machine having a pair of laterally spaced, contrarotatable harvesting elements, the improvement of a plant lifter, comprising a pair of laterally spaced housings projecting forwardly of said harvesting elements, respectively, means pivotally supporting said housings from said harvesting machine for free vertical movement and means limiting downward movement of said housings, primary plant lifting tines carried by said housings adjacent the forward ends thereof and trailing rearwardly therefrom, said tines being directed inwardly and rearwardly of said housings toward said harvesting elements, shoes secured to the extreme forward ends of said housings to project forwardly therefrom and generally therebelow, and secondary tines on said shoes forwardly of said plant lifting tines and extending rearwardly and inwardly therefrom to terminate above said primary plant lifting tines to direct low-lying crop bearing portions of plants to said secondary plant lifting tines.

References Cited in the file of this patent
UNITED STATES PATENTS

| 1,451,090 | Wilson | Apr. 10, 1923 |
| 1,878,941 | Lindgren | Sept. 20, 1932 |
| 1,926,338 | Johnston | Sept. 12, 1933 |
| 1,978,888 | Thomann | Oct. 30, 1934 |
| 2,001,079 | Court | May 14, 1935 |
| 2,491,777 | Smith | Dec. 20, 1949 |
| 2,654,203 | Hyman | Oct. 6, 1953 |